(12) United States Patent
Bhardwaj (10) Patent No.: US 11,609,848 B2
(45) Date of Patent: Mar. 21, 2023

(54) MEDIA MANAGEMENT BASED ON DATA ACCESS METRICS

(71) Applicant: Micron Technology, Inc., Boise, ID (US)

(72) Inventor: Amit Bhardwaj, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 158 days.

(21) Appl. No.: 16/943,143

(22) Filed: Jul. 30, 2020

(65) Prior Publication Data
US 2022/0035735 A1 Feb. 3, 2022

(51) Int. Cl.
*G06F 12/02* (2006.01)
*G06F 12/1009* (2016.01)

(52) U.S. Cl.
CPC ...... *G06F 12/0253* (2013.01); *G06F 12/0246* (2013.01); *G06F 12/1009* (2013.01); *G06F 2212/1044* (2013.01); *G06F 2212/7201* (2013.01); *G06F 2212/7205* (2013.01); *G06F 2212/7208* (2013.01)

(58) Field of Classification Search
None
See application file for complete search history.

(56) References Cited

U.S. PATENT DOCUMENTS

| 9,183,134 | B2* | 11/2015 | Haines | G06F 12/0246 |
| 2014/0047210 | A1* | 2/2014 | Cohen | G06F 12/0246 |
| | | | | 711/202 |
| 2015/0347296 | A1* | 12/2015 | Kotte | G06F 3/064 |
| | | | | 711/103 |
| 2018/0293003 | A1* | 10/2018 | Muchherla | G11C 16/10 |

OTHER PUBLICATIONS

J. Guo, Y. Hu, B. Mao and S. Wu, "Parallelism and Garbage Collection Aware I/O Scheduler with Improved SSD Performance," 2017 IEEE International Parallel and Distributed Processing Symposium (IPDPS), 2017, pp. 1184-1193, doi: 10.1109/IPDPS.2017.55. (Year: 2017).*
Kee-Hoon Jang and Tae Hee Han, "Efficient garbage collection policy and block management method for NAND flash memory," 2010 2nd International Conference on Mechanical and Electronics Engineering, 2010, pp. V1-327-V1-331, doi: 10.1109/ICMEE.2010.5558538. (Year: 2010).*

* cited by examiner

*Primary Examiner* — Jared I Rutz
*Assistant Examiner* — Marwan Ayash
(74) *Attorney, Agent, or Firm* — Lowenstein Sandler LLP (57) ABSTRACT

A number of data access operations is tracked where the data access operations are associated with each of a plurality of portions of a translation map. The translation map maps a plurality of logical block addresses to a plurality of physical block addresses of the memory device. A criterion to perform a garbage collection operation is determined to be satisfied. The garbage collection operation is to be performed on a block of the memory component. The block for performing the garbage collection operation is identified based on the number of data access operations associated with each of the plurality of portions of the translation map. The garbage collection operation is performed on the identified block.

17 Claims, 6 Drawing Sheets

MEDIA MANAGEMENT BASED ON DATA ACCESS METRICS

TECHNICAL FIELD

Embodiments of the disclosure relate generally to memory sub-systems, and more specifically, relate to performing garbage collection operations based on data access metrics in memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to performing garbage collection operations based on data access metrics in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

The memory devices can include volatile and non-volatile memory devices that can store data from the host system. One example of non-volatile memory devices is a negative-and (NAND) memory device. Other examples of non-volatile memory devices are described below in conjunction with FIG. 1. Each of the non-volatile memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and has two logic states. As another example, a quad level cell (QLC) can store four bits of information and has sixteen logic states.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page. For some types of memory devices (e.g., NAND), memory cells can be grouped into an erase unit, such as a physical block, which is a group of pages. A physical block is a 2-dimensional memory array of pages (rows of cells) and strings (columns of cells). Data can be written to a block, page-by-page. Data can be erased at a block level. However, portions of a block cannot be erased.

Memory cells in the same erase unit (e.g., block) can be configured to store a specific number of bits of information. For example, a quad level cell (QLC) block includes memory cells configured to store four bits of information. Accordingly, a QLC block, for example, can store more bits of information than a single level cell (SLC) block (having memory cells configured to store one bit of information).

A memory sub-system controller can perform operations for media management algorithms, such as wear leveling, refresh, garbage collection, scrub, etc., to help manage the data on the memory sub-system. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

When the host system requests to store data, the data is stored at a physical address within the memory component. The host system provides a logical address identifying the data to be stored. A logical to physical (L2P) translation map is maintained to identify the physical location where the data corresponding to each logical address resides. When the data is written to the memory component, it can be done at the write unit level, that is, at the page level, such that an entire page, or multiple pages, is written in a single operation. When the host system requests to update data at a particular logical address, the updated data is stored at a new physical location (e.g., a new physical address) and the L2P mapping is updated so that the particular logical address of the new data is mapped to the new physical address. The original data (e.g., the data prior to the update) still remains stored in the original physical address. This data, however, is no longer valid from the host's perspective, and is no longer usable by the host. With various changes in data, the memory component accumulates physical addresses across various physical blocks that have invalid data, in addition to having physical addresses with valid data. The invalid data stored at the memory component is considered "garbage" and can be cleaned out at some point.

When the memory component is full, such that there is insufficient capacity to accept data from additional write operations, certain data can be erased in order to free up space. When data is erased from the memory component, it is done at the erase unit level, that is, at the physical block level, such that an entire block (including multiple pages) is erased in a single operation. Thus, when a particular segment of data on the memory component is updated, certain pages in a block will have data that is no longer needed. A block may have some pages containing valid data and some pages containing invalid data, so the entire block cannot be erased due to the need for preserving the valid data. A memory sub-system controller can perform a media management operation for managing the space in the block. A media management operation, such as a garbage collection ("GC") operation, can be performed, which involves migrating (e.g., rewriting) those pages of the block that contain valid data to another block, so that the current block with both valid and invalid data can be erased while preserving the data at the migrated location. Garbage collection operations include, for example, identifying a block that contains valid and invalid data, selecting pages in the block that contain valid data, copying the valid data to new locations (e.g., free pages in another block), marking the data in the previously selected pages as invalid, and erasing the identified block. Garbage collection is a form of automatic memory management that attempts to reclaim garbage, or memory occupied by stale data objects that are no longer in use. The basic principle of garbage collection is to find data objects that cannot or need not be accessed in the future, and to reclaim the resources (i.e. storage space) used by those objects.

Since garbage collection can write the valid data to a different block before the block is erased, data can be rewritten many times to different blocks at the memory sub-system. The amount of additional rewrites of data in the memory sub-system is referred to herein as write-amplification. Write-amplification can reduce the operating life of a memory sub-system. To reduce write-amplification, the memory sub-system can include some amount of additional blocks in excess to a total number of blocks that are available at any single time to store data from the host system. Such additional blocks can be considered over-provisioning. A larger amount of over-provisioning can significantly reduce write-amplification as the number of times that data is rewritten within the memory sub-system due to garbage collection attempting to free up blocks is reduced.

Some of the data that the host system requests to store are written to, or overwritten in, the memory devices more frequently than others. The frequently-written data is referred to as "hot data" and can include journals, file system metadata, and other frequently-updated data. In some circumstances, a block can include data that is valid for a relatively long period of time without being overwritten. Such infrequently-written data is referred to as "cold data" and can include operating system data that rarely changes, media files, and other data that is static or rarely updated. Thus, the hotness and the coldness of the data represents the level of frequency of the rewrite of data.

To select a source block on which the garbage collection operation is to be performed, the conventional memory sub-system selects the block with the least amount of valid data to minimize the amount of valid data that is rewritten to a destination block. For example, the source block is selected from a pool of source blocks based on the amount of valid data in the blocks in the pool. If the pool of source blocks include any block that has no valid data (e.g., a valid data count for the block equals to zero), then the block is moved from the pool of source blocks for GC operation, as data from the block can be erased without moving any data to another location. The block with the least amount of valid data is then selected as a source block for GC operation, so that the minimum number of valid data is rewritten to a new location in order to perform the GC operation before the data in the source block can be erased. The destination block to which the valid data is rewritten is typically selected by identifying the youngest (i.e., the least recently modified) free block available for the rewrite of the valid data. Typically, the selection of the source and destination blocks are performed without factoring in the hotness and/or coldness (e.g., frequency of overwrites) of the data in the blocks, and the blocks can end up having a mix of hot data and cold data.

Even though cold data does not need to be rewritten to a different location without a change in the data, unchanged cold data that is located on the same memory block as hot data is likely to be copied to new block numerous times by garbage collection operations because of changes to the hot data located on the same block. Thus, repeated writing of the same data that has been previously written, referred to as write amplification, is increased because of cold data and hot data being located on the same block. "Hot blocks" that contain primarily hot data are more likely to be selected for garbage collection because hot data is frequently invalidated, and garbage collection algorithms select blocks having the lowest amount of valid data for garbage collection. Any cold data that is stored in the hot blocks increases garbage collection effort and write amplification, and is more likely to be processed by in garbage collection operations because it is in the same blocks as hot data. Increased write amplification reduces the performance of the memory sub-system. The repeated write operations can reduce response time and throughput, and also reduce the lifespan of the memory devices that store the data.

Aspects of the present disclosure addresses the above and other deficiencies by performing garbage collection operation based on data access metrics in memory sub-systems. The memory sub-system can receive a data access request, such as a read request or a write request, from the host system. The host system can provide the logical blocks on which the data access is to be performed. The memory sub-system can use a logical to physical (L2P) translation map to identify physical blocks that correspond to requested logical blocks. The memory sub-system can partition the L2P map into multiple regions to keep track of data access metrics associated with each region of the L2P map. In an example, the partitioned regions can be stored in a region table that can include a start L2P entry, size (e.g., length) of the region if the size is variable, counters, etc. The memory sub-system can partition the regions based on various factors. The granularity and/or the number of regions for the partition can depend on these factors. For example, one factor based on which the regions can be partitioned is available memory space. In an example, available memory space can refer to the available space on the memory location where the regions (e.g., region table) are stored. For example, the L2P map regions can be stored in a cache space, DRAM space, etc. In another example, if the memory sub-system utilizes a power down capacitor, the memory sub-system can partition the regions based on the budget (e.g., capacity) allocated for the power down capacitor. For example, the power down capacitor may be able to process a limited amount of data when necessary. For each region, the memory sub-system can maintain a counter to track the number of data access operations requested by the host system that are associated with logical blocks in the region. For example, each time a write request is directed to a logical block that belongs to a specific region of the L2P map, a write counter can be increased for the specific region. The counters can be used as the data access metrics. The memory sub-system can maintain a heat map based on the counters, where a first region is considered to be hotter than a second region if the counter value associated with the first region is higher than the counter value associated with the second region. When GC is triggered, the memory subsystem can select a block to perform the GC using the heat map. The memory sub-system can select a region that meets the criteria for being a cold region. For example, the memory sub-system can select the region with the minimum counter value among all L2p map regions. The memory sub-system can then select a source block from the set of blocks associated with the selected cold region (e.g., the block that has the least amount of valid data). In doing so, the memory sub-system can still achieve the goal of doing minimum work during GC by selecting a block with low amount of valid data, while avoiding to select hot data that belongs to a hot region when performing GC, which would then get invalidated by host soon and increase write amplification.

Advantages of the present disclosure include, but are not limited to, decreasing write amplification, decreasing power consumption, increasing endurance of the memory device, requiring less resources and computational power, and/or freeing system resources for other functionalities. Since the data access metrics, such as frequency of overwrites of data, are factored into the selection of blocks for media management operations, such as garbage collection, the mixing of frequently overwritten data to infrequently overwritten data can be avoided while performing the garbage collection operations. By selecting infrequently overwritten data for GC, the memory device can also avoid unnecessarily rewriting frequently overwritten data to another location which is likely to be invalidated again soon. These improvements lead to reducing write amplification. The reduced write amplification can provide for improved performance of the memory sub-system as fewer write operations are performed as part of the garbage collection operation, and increased storage efficiency. The reduction in the number of writes to blocks of physical memory can also increase the endurance and operating lifespan of the memory sub-system, since fewer write operations are performed as part of the garbage collection operations.

Figure 1:
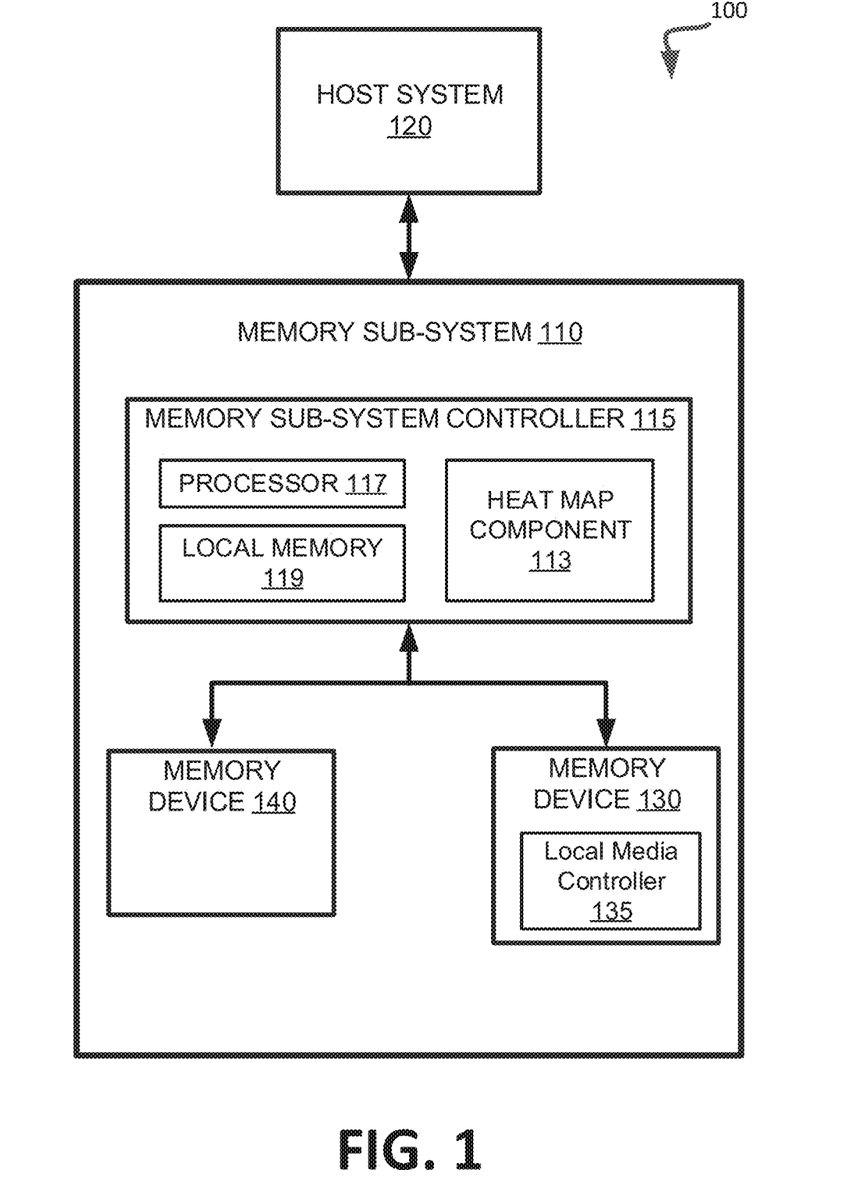
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a heat map component 113 that can be used to maintain data access metrics for use with a garbage collection operation on the blocks of memory device 130 and 140. In some embodiments, the memory sub-system controller 115 includes at least a portion of the heat map component 113. For example, the memory sub-system controller 115 can include a processor 117 (processing device) configured to execute instructions stored in local memory 119 for performing the operations described herein. In some embodiments, the heat map component 113 is part of the host system 110, an application, or an operating system.

In one embodiment, the heat map component 113 can use the logical to physical (L2P) translation map, which maps logical block addresses to physical block addresses, to derive a heat map for the memory device 130 and/or 140. The heat map component 113 can divide the L2P map into multiple regions. The heat map component 113 can track a number of data access operations associated with each region of the L2P map. The heat map component 113 can track the number of data access operations using one or more counters associated with each region of the L2P map. For example, when the host system 120 sends a write request to store data specifying a logical block, heat map component 113 can increase a write counter to track the number of write operations performed using the region associated with the specified logical block in the write request. In another example, when the host system 120 sends a read request to read data from the memory device 130 and/or 140, the heat map component 113 can increase a read counter to track the number of read operations performed using the region associated with the specified logical block in the read request. The counters can be used as the data access metrics. The heat map component 113 can derive a heat map of the logical space of the memory device based on the counters. The value of the counter associated with a region can be proportionate to the hotness of the region as a whole. That is, the higher the counter value, the hotter the region. The heat map component 113 can designate a first L2P region to be hotter than a second L2P region if the counter value associated with the first L2P region is higher than the counter value associated with the second L2P region. In some implementations, the heat map component 113 can select a source block for performing the GC operation using the heat map. The heat map component 113 can select an L2P region that meets the criteria for being a cold region. For example, the heat map component 113 can select the region with the least counter value. In another example, the heat map component 113 can select a region that has a counter value that is below a threshold metric. The heat map component 113 can then select a block from the set of blocks associated with the selected region, based on the amount of valid data. For example, the block with the least amount of valid data can be selected as the source block for the GC operation. When the GC operation is triggered, the heat map component 113 can provide the source block for performing the GC operation. In another implementation, the memory sub-system, or a component of the memory sub-system, can select the source block for performing the GC operation using the heat map generated by the heat map component 113. Further details with regards to the operations of the heat map component 113 are described below.

Figure 2:
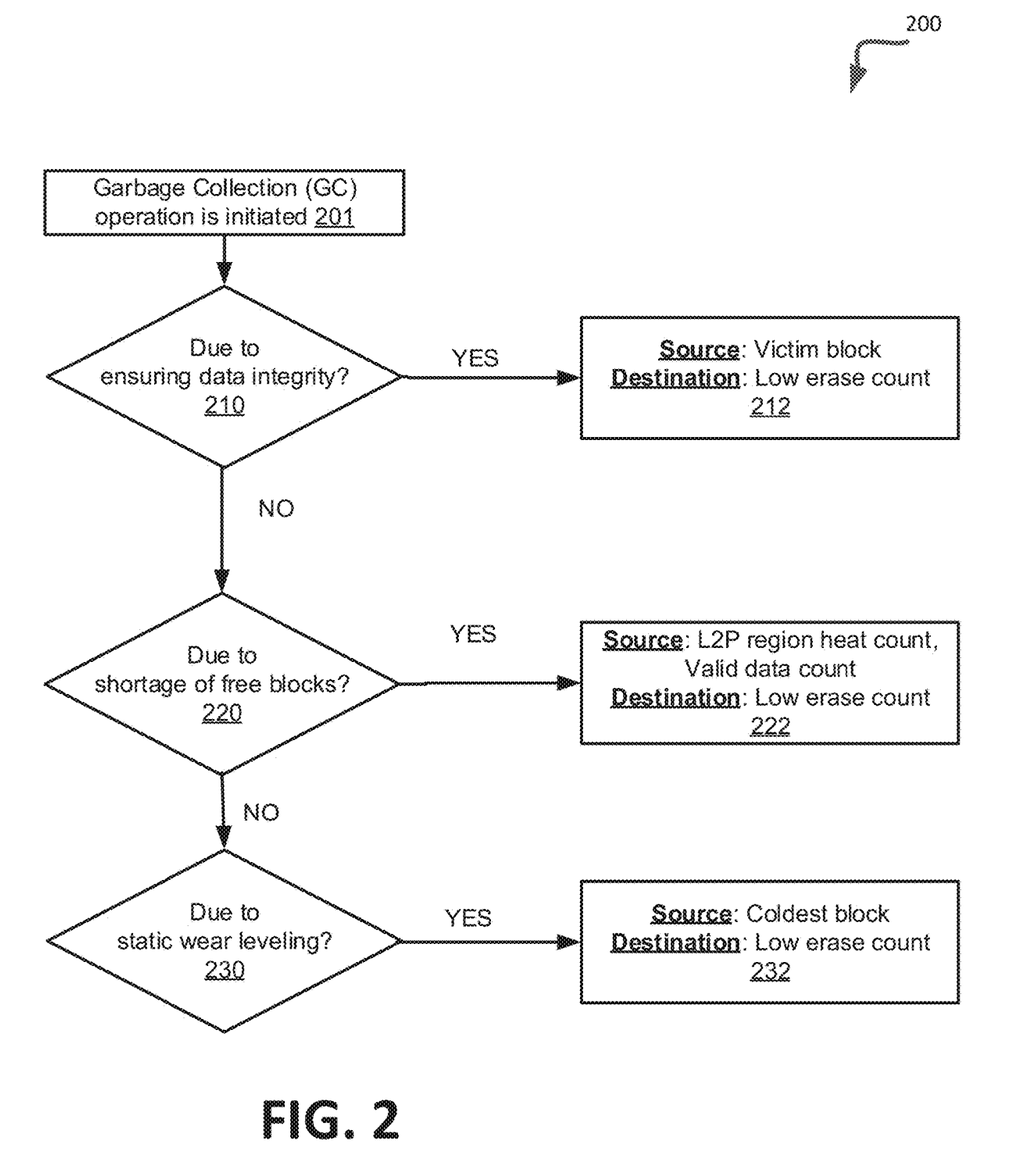
FIG. 2 depicts criteria for selection of blocks for performing garbage collection operations, in accordance with some embodiments of the present disclosure.

FIG. 2 depicts criteria for selection of blocks for performing garbage collection operations in a memory sub-system 200, in accordance with some embodiments of the present disclosure. Memory sub-system 200 can include a controller that determines when it is appropriate to initiate a media management operation. In an example, the media management operation can include a garbage collection operation. When the controller determines that a criterion to perform a garbage collection operation is satisfied, the controller can initiate the garbage collection operation, as depicted in block 201. A GC operation that can be invoked in the background without disrupting host requests is known as a background GC ("BGC") operation. For example, GC can be initiated periodically as part of regular memory management operations for the memory sub-system. In some examples, the controller can determine that the memory sub-system, or certain components within the memory sub-system, is in an idle state or is experiencing downtime and a BGC can be performed during this time. In an example, during host idle time, a BGC operation can be performed to relocate host data stored in a static single level cell (SLC) cache to reclaim the blocks. On the other hand, a GC operation that takes place concurrently with host requests or is prioritized before the host requests is known as foreground or active GC ("AGC"). In some examples, GC is initiated in response to a particular event, such as, receiving a particular write request (e.g., from the host system) and a determination that memory components have insufficient capacity to accept the write request. In some examples, the controller can determine that the memory component is full and/or there is insufficient capacity to accept any additional potential write operations that can be received from the host and that garbage collection needs to be performed to free up space in the memory component. In some example, an AGC is performed to ensure data integrity is maintained. Based on the determination of the appropriate time, the controller can initiate the garbage collection operation to erase invalid data from certain blocks.

The controller can determine to initiate GC due to various circumstances. In some examples, performing GC can be critical due to the particular circumstance. In other examples, performing GC can be non-critical. In some examples, performing GC can take a significant amount of time. For example, the blocks can be very fragmented due both valid and invalid data in various locations of each block, making the GC operation to take a significant amount of time. In some examples, performing the GC operation can be necessary within a short amount of time. For example, the memory component can be full and capacity to accept additional host write requests can be insufficient, calling for the GC operation to be performed immediately. Based on the length of time to perform GC and how soon GC needs to be performed, the criticality level of performing GC may vary.

The criteria for selection of source blocks for performing GC operations can vary based on the circumstances leading to the initiation of the GC operation. If a GC operation is initiated as depicted in block 201, the memory sub-system can determine whether the GC operation is initiated due to ensuring data integrity, as depicted in decision point 210. A particular block can be prioritized for garbage collection due to the data state metric (e.g., a bit error rate) of the block satisfying a threshold condition. The mitigation in such scenario can be to perform a GC operation. The particular block in this instance is referred to as the "victim block." The memory sub-system can identify the victim block and place it in a queue to be selected as a source block for a GC operation. The memory sub-system can maintain a pool of victim blocks. In some examples, the victim blocks can be selected for GC in the order the blocks were placed in the pool, such as a "first in, first out" (FIFO) order. Examples of priority victim blocks can include blocks selected due to error handling (EH), read disturb (RD), data retention (DR), background scan (BG), asynchronous power loss (APL), etc. As depicted in block 212, the memory sub-system can select the source block for the GC operation in such circumstances to be the victim block which was already identified as a candidate source. The destination block where the data is rewritten as a result of GC can be a block that is considered to be a healthy block. For example, a block with a low erase count is considered to be healthy. An erase count is the number of times an erase operation that erases data from a data unit is performed on the data unit during the lifetime of the data unit. The destination block can be selected based on the erase count associated with candidate destination blocks. For example, a pool of candidate destination blocks can be sorted by ascending erase count associated with the blocks and the block with the lowest erase count can be selected as the destination block for the GC operation.

The memory sub-system can further determine whether the GC operation should be performed due to shortage of free blocks, as depicted in decision point 220. The memory sub-system can determine that there is not a sufficient number of free blocks in the system per the specification of the memory sub-system. The memory sub-system can perform GC to migrate valid data from a source block to a destination block and erase invalid data from the source block to free up space.

In the memory sub-system 200 of the present disclosure, the source block for performing the GC operation is selected in view of data access metrics associated with frequency of overwrite of data. The memory sub-system 200 can use a logical to physical (L2P) translation map to identify physical blocks that correspond to requested logical blocks. The memory sub-system can partition the L2P map in multiple regions to keep track of data access metrics associated with each region of the L2P map. The memory sub-system can maintain a heat map indicating the data hotness (i.e., update frequency) of a region based on counters tracking the number of data access (e.g., write requests, read requests, etc.) directed to a region of the L2P map. A higher value for a counter indicates that a region has a higher number of hot data than another region that has a lower value for the counter. When GC is triggered, the memory subsystem can select a block to perform the GC using the heat map. The memory sub-system 200 can select a region of the L2P map that meets the criteria for being a cold region, such as a region with a counter value below a threshold counter value. The memory sub-system 200 can then select a source block from the set of blocks associated with the selected region based on the amount of valid data, such as a block with an amount of valid data below a threshold amount of valid data. The destination block is selected based on the erase count, as described with respect to block 212. The selection criteria is depicted in block 222. Further details with regards to selection of the blocks for the GC operation are described with respect to FIG. 2.

The memory sub-system can further determine whether the GC operation should be initiated due to static wear leveling, as depicted in decision point 220. The memory components used by the memory sub-system can have particular properties that provide challenges in the operation of the memory sub-system. For example, some memory components, such as non-volatile memory components, have limited endurance. For example, some memory components can be written, read, or erased a finite number of times before physical wear causes the memory components to fail. Because of the limited endurance of memory components, techniques have been developed to manage wear on memory components. One technique of managing the endurance of memory components is wear leveling. A wear leveling operation can attempt to evenly distribute the physical wear across the data units (e.g., blocks) of memory components. Data of a data unit having a maximum read or write count can be swapped with data of a data unit having a minimum read or write count in an attempt to evenly distribute the wear across the data units of memory components. Static wear leveling is a process of collecting and performing GC on long resident data (e.g., cold data) into blocks that have higher wear than others in the system. As such, if the GC operation is due to static wear leveling, the memory sub-system can select as the source block the coldest block from a pool of source blocks. In one example, the coldest block can be identified based on the write count and/or the read count associated with a block of the pool of source blocks. In another example, the coldest region can be identified and the block with the least amount of valid data can be selected as the source block. The destination block is selected based on the erase count, as described with respect to block 212.

Figure 3:
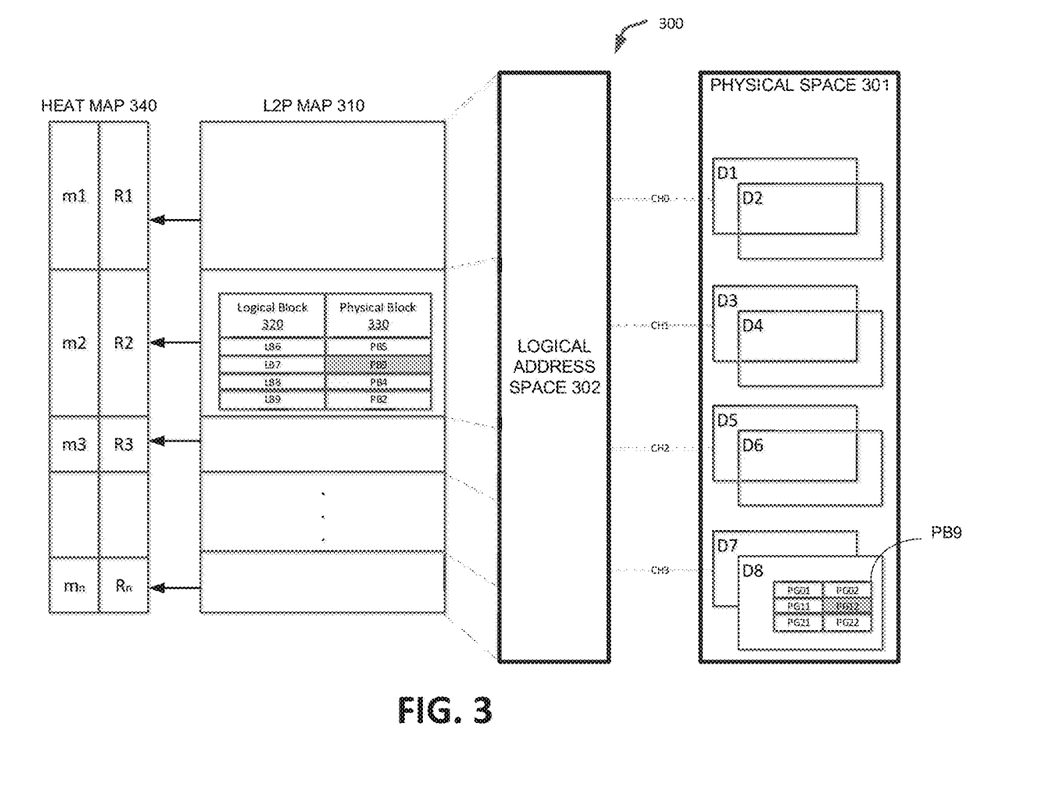
FIG. 3 depicts an example of performing garbage collection operations based on data access metrics, in accordance with some embodiments of the present disclosure.

FIG. 3 depicts an example of performing garbage collection operations based on data access metrics in a memory device 300, in accordance with some embodiments of the present disclosure. Memory device 300 can correspond to the memory device 130 and/or 140 in depicted in FIG. 1.

In one embodiment, memory device 300 is shown to include 4 channels CH0-CH3 under physical space 301. Each channel includes two dices, with a total of eight dices D1-D8 within the physical space 301. An example physical block PB9 is shown to be included in die D8.

In one embodiment, a logical address space 302 can be used by the host system 120 to access the memory device 300. The logical address space can identify a group of logical blocks (e.g., smallest host transfer unit) using logical block addresses (LBAs). The host system 120 can send a data access request, such as a read request or a write request, to the memory device 300 directed to the logical address space 302. The host system 120 can provide logical block addresses on which the data access is to be performed.

The memory device 300 can maintain a logical to physical (L2P) translation map 310. In an example, the L2P map 310 can map logical blocks 320 to physical blocks 330, where a logical block LB6 is shown to correspond to a physical block PB6. In one example, the L2P map 310 can map logical block addresses to physical block addresses. In another example, the L2P map can describe the relationship between the logical blocks and the physical blocks using other groupings of the logical and physical blocks. For example, a translation unit (TU) can be used to identify the smallest portion of an L2P map. A TU can comprise a group of LBAs. A TU can be mapped to groups of pages, physical blocks, etc. The memory device 300 can use the L2P map 310 to identify physical blocks that correspond to requested logical blocks to perform the data access requests of the host system 120.

In an embodiment of the present disclosure, heat map component 113 can use the L2P map 310 to derive a heat map 340 for the memory device 300. The heat map component 113 can divide the L2P map 310 into multiple portions. In the example of FIG. 2, the L2P map 310 is divided in "n" regions (e.g., portions), from region R1 to region Rn to derive the heat map 340. Although heat map 340 is shown as a separate element in the example, heat map 340 can be part of the L2P map 310 in other examples. The heat map component 113 can track a metric associated with each region of the L2P map. For example, the heat map component 113 can track metric m1 associated with region R1, and so on. Heat map 340 can identify metrics $m1$-$m_n$ corresponding to regions R1-Rn. Heat map 340 can include objects, metadata, tags, etc. to identify which portion of the L2P map 310 is included in each region of R1-Rn. In an example, the metrics can identify frequency of data access associated with each region of the translation map. For example, the metrics can identify which region has more hot data than other regions.

In an embodiment, a metric in the heat map 340 can comprise a number of data access operations associated with a particular region of the L2P map 310. The heat map component 113 can track the number of data access operations using one or more counters associated with each region of the L2P map. The counters can include a read counter, a write counter, or a combination thereof. For example, whenever the host system 120 sends a write request to store data by specifying a particular logical block, heat map component 113 can increase a write counter associated with a region corresponding to the particular logical block. The write counter thus tracks the number (e.g., count) of write operations performed using the region associated with the particular logical block in the write request. For example, metric m2 can represent a write counter associated with region R2. When the host system 120 sends a write request directed to a logical block LB8 that corresponds to region R2, the metric m2 (e.g., the write counter) associated with region R2 can be increased by one unit. In one example, the memory device 300 receives the write request directed to LB7 associated with region R2 of the translation map 310 from host system 120, the memory device performs the write operation using a physical block PB9 of die D8 of the memory device, updates the translation map to map the logical block LB7 to the physical block PB9 on the region R2 of the translation map 310, and upon updating the translation map, updates (e.g., increases) the write counter (e.g., m2) of write operations performed using the region R2 of the translation map 310. Similarly, each of the metrics $m1-m_n$ can represent a write counter associated with each of the respective regions of the L2P map.

In another example, when the host system 120 sends a read request to read data from the memory device 300, the heat map component 113 can increase a read counter to track the number of read operations performed using the region associated with the specified logical block in the read request. In an example, each of the metrics $m1-m_n$ can represent a read counter associated with each of the respective regions of the L2P map. In one example, the memory device 300 receives a read request directed to logical block LB9 associated with region R2 of the translation map 310, performs the read operation using physical block PB2 of the memory device corresponding to the logical block LB9 in the L2P map 310, and upon performing the read operation, updates (e.g., increases) a read counter (e.g., m2) of read operations performed using the region R2 of the translation map.

In some examples, metric $m1-m_n$ can include a separate read counter and a separate write counter associated with each of the respective regions of the L2P map. In yet other examples, the metrics can represent a combined read and write counter for tracking a number of read and write requests directed to each region in total.

The heat map component 113 can derive the heat map 340 of the logical space of the memory device using the counters that represents the metrics. The heat map 340 can indicate the hotness of data in the aggregate for each of the regions of the translation map. The value of the counter associated with a region can be proportionate to the hotness of the region as a whole. That is, the higher the counter value, the hotter the region. The heat map component 113 can designate a first L2P region to be hotter than a second L2P region if the counter value associated with the first L2P region is higher than the counter value associated with the second L2P region. In an example, the value of the counter m1 corresponding to region R1 is 100, the value of the counter m2 corresponding to region R2 is 50, and the value of the counter m3 corresponding to region R3 is 500. The heat map thus indicates that out of the three regions R1-R3, region R3 is the hottest region because of the highest counter value of 500, region R1 is the second hottest region with the next highest counter value of 100, and the region R3 is the least hot region with the least counter value of 50.

In some implementations, the heat map component 113 can identify a source block for performing the GC operation using the heat map. The heat map component 113 can determine that a metric in the heat map that is associated with a particular L2P region satisfies a data migration criterion for performing a GC operation. In some examples, the metric satisfies the data migration criterion when the value of the metric is below a threshold value. For example, the value of the metric can be below a threshold T number of data access operations defined for memory device 300 when the criterion is considered satisfied. For example, the data migration criterion can include migrating valid data as part of the GC operation when the data is not considered to be hot data. More particularly, the data migration criterion can be defined as an L2P region having a metric value that is less than threshold T. In an example, T can be equal to 120. For that example, the metric m1 and m2 associated with regions R1 and R2, respectively, satisfy the data migration criterion, as the values of m1 (100) and m2 (50) are both less than the threshold value of 120. In that case, both regions R1 and R2 can be selected for further consideration for selecting, as a source block, a particular physical block associated with the regions R1 and R2. The particular block selected can be selected based on amount of valid data in the block (e.g., the block having the least amount of valid data). In other examples, the data migration criterion can indicate that the value of the metric is more than or equal to a threshold value, or that the value of the metric is the highest or lowest value out of all regions, etc.

In one implementation, the heat map component 113 can identify the source block for performing the GC operation based on the number of data access operations associated with each of the regions of the L2P map 310. In an example, the heat map component 113 can select an L2P region that meets the criteria for being a cold region. In some examples, the heat map component 113 can identify the source block for performing the GC operation by comparing the number of data access operations for each region of the L2P map. In some examples, the heat map component 113 can identify the source block corresponding to a particular region of regions R1-Rn of the L2P map where the number of data access operations associated with the region R2, which is 50, is less than the number of data access operations associated with other regions R1 and R3, which are 100 and 500, respectively, of the L2P map. That is, the heat map component 113 can select the region with the least counter value. In another example, the heat map component 113 can select a region that has a counter value that is below a threshold counter value.

Once the region is selected based on the data access metric, the heat map component 113 can then select a particular block from the set of blocks associated with the selected region, based on the amount of valid data. For example, the block with the least amount of valid data can be selected as the source block for the GC operation. In some examples, the amount of valid data can be tracked using a valid translation unit count (VTC). In an example, once the heat map component 113 identifies the coldest region to be R2, the heat map component 113 can search though physical blocks corresponding to logical blocks in region R2 to find the physical block that has the least amount of valid data. In one example, out of the four physical blocks shown in column 330 in region R2, physical block PB5 can have no valid data altogether, in which case the block is not considered for GC. The data in the block PB5 can rather be erased without migrating any data to another block since there is no valid data in that block. In another example, physical block PB9 can contain only one page PG12 that has valid data and the remaining pages with invalid data, while the remaining blocks PB4 and PB2 can contain more than one page of valid data. In that case, PB9 can be considered to be the best block to select for GC, as only data from one page of the block is to be migrated with the GC operation before erasing the data in the block, compared to having to migrate data from multiple pages for the other two blocks.

In an embodiment, the memory device 300 can determine that a criterion to perform a garbage collection operation is satisfied (e.g., to free up space). In an example, when the GC operation is triggered, the heat map component 113 can provide the identified source block to memory device 300 for performing the GC operation. In another example, the heat map component 113 can provide the source block to a pool of source blocks for GC operation and when the GC operation is triggered, the memory device 300 can select the source block from the pool of source blocks provided by the heat map component 113. In other embodiments, the memory device 300, or a component of the memory device 300, can select the source block for performing the GC operation using the heat map 340 generated by the heat map component 113.

In an embodiment, the memory device 300 performs the garbage collection operation on the identified block. For example, memory device 300 can perform the GC operation on identified source block PB9. In some examples, the memory device 300 migrates data from the identified block PB9 to another block to perform the garbage collection operation. For example, the memory device 300 can select pages in the block that contain valid data (e.g., PG12), copy the valid data from the selected page, write the data to a new physical block (e.g., a block with low erase count, as described with respect to FIG. 2), mark the data in the selected page PG12 as invalid, and erase the identified block PB9. Thereby, the memory device 300 can complete performing the GC operation in view of the heat map 340 generated based on the tracked data access metrics.

Figure 4:
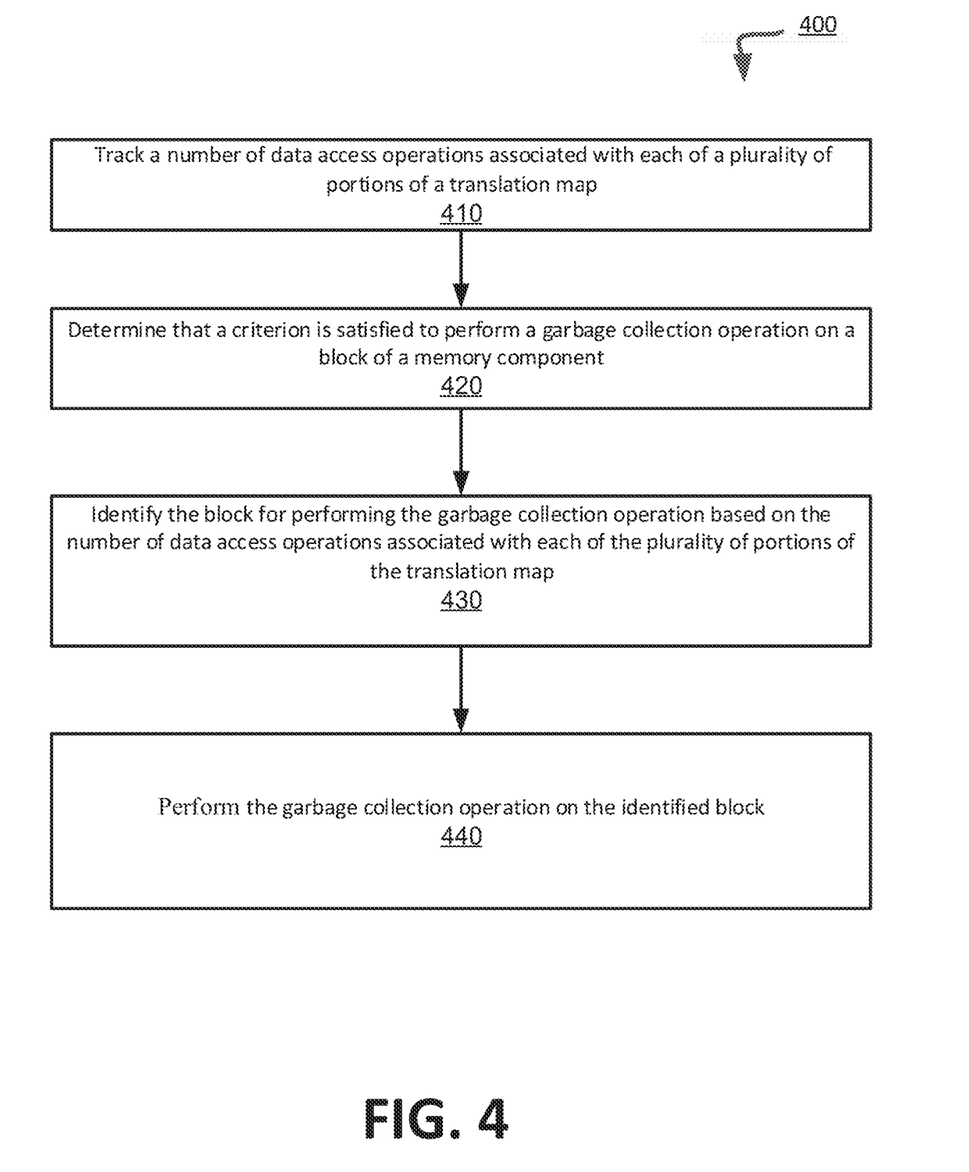
FIG. 4 is a flow diagram of an example method to perform garbage collection operations based on number of data access operations, in accordance with some embodiments of the present disclosure.

FIG. 4 is a flow diagram of an example method 400 to perform garbage collection operations based on number of data access operations associated with portions of a translation map, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the heat map component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic tracks a number of data access operations associated with each of a plurality of portions of a translation map. The translation map maps a plurality of logical block addresses to a plurality of physical block addresses of the memory device. In one implementation, the processing logic maintains a write counter to track a count of write operations performed using each portion of the plurality of portions of the translation map. In some examples, the processing logic receives a write request directed to a first logical block address associated with a first respective portion of the translation map, performs the write operation using a first physical block address of the memory device, updates the translation map to map the first logical block address to the first physical block address on the first respective portion of the translation map, and upon updating the translation map, updates a write counter of write operations performed using the first respective portion of the translation map. In one implementation, the processing logic maintains a read counter to track a count of read operations performed using each portion of the plurality of portions of the translation map. In some examples, the processing logic receives a read request directed to a second logical block address associated with a second respective portion of the translation map, performs the read operation using a second physical block address of the memory device corresponding to the second logical block address, and upon performing the read operation, updates a read counter of read operations performed using the second respective portion of the translation map.

At operation 420, the processing logic determines that a criterion to perform a garbage collection operation is satisfied. The garbage collection operation is to be performed on a block of a memory component. In some examples, the criterion to perform the garbage collection operation is satisfied when a number of available blocks to perform write operations is below a threshold number.

At operation 430, the processing logic identifies the block for performing the garbage collection operation based on the number of data access operations associated with each of the plurality of portions of the translation map. In some examples, the processing logic identifies the block for performing the garbage collection operation based on comparing the number of data access operations for each of the portion of the plurality of portions of the translation map. In some examples, the identified block is associated with a particular portion of the plurality of portions of the translation map. In some examples, the processing logic identifies the block corresponding to a particular portion of the plurality of portions of the translation map where the number of data access operations associated with the particular portion is less than the number of data access operations associated with other portions of the plurality of portions of the translation map.

At operation 440, the processing logic performs the garbage collection operation on the identified block. In some examples, the processing logic migrates data from the identified block to another block to perform the garbage collection operation.

Figure 5:
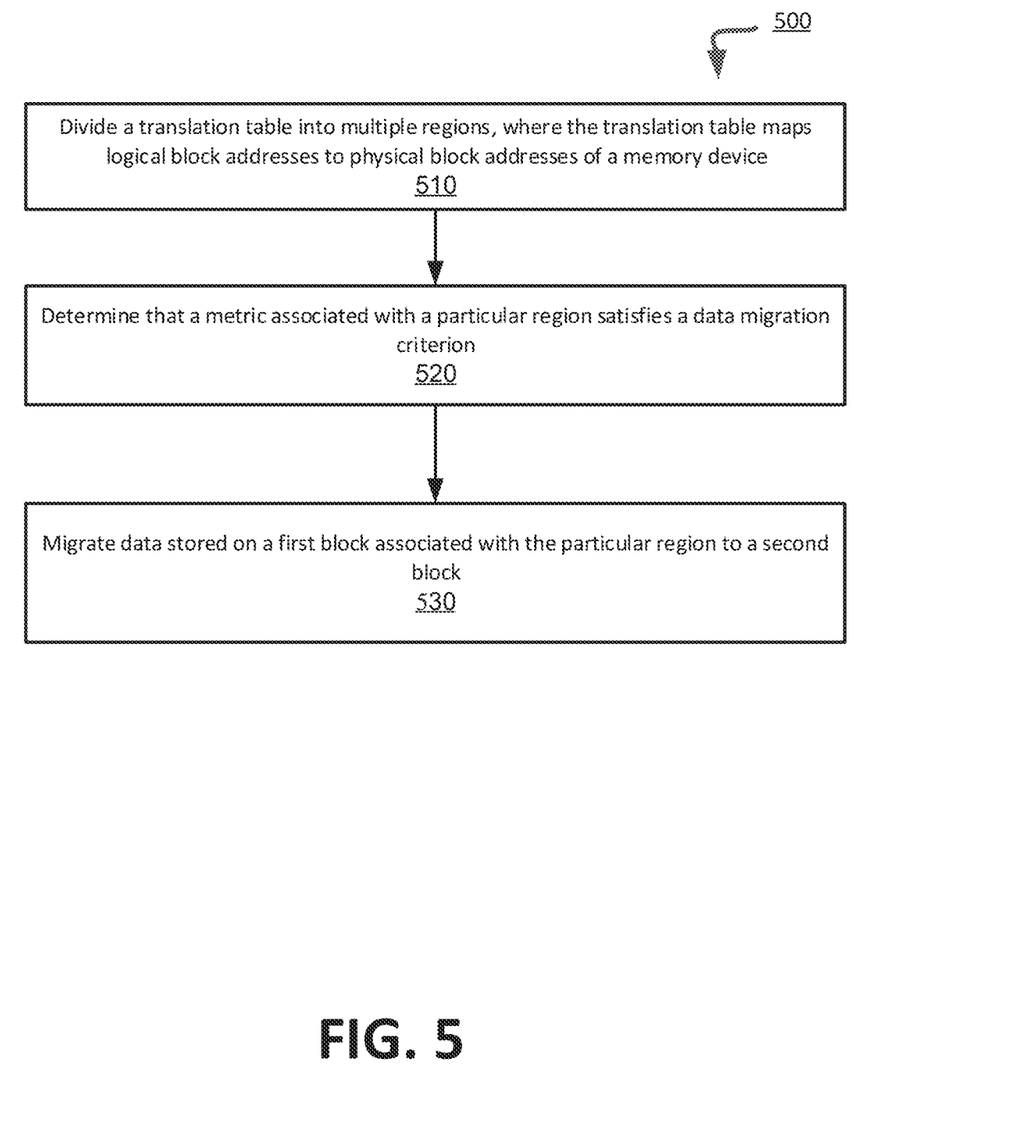
FIG. 5 is a flow diagram of an example method for migrating data based on a data migration criterion associated with regions of a translation map, in accordance with some embodiments of the present disclosure.

FIG. 5 is a flow diagram of an example method 500 for migrating data based on a data migration criterion associated with regions of a translation map, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the heat map component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic divides a translation table into multiple regions. The translation table maps logical block addresses to physical block addresses of a memory device. At operation 520, the processing logic determines that a metric associated with a particular region satisfies a data migration criterion. In some examples, the metric comprises a number of data access operations associated with the particular region of the translation map. In some examples, the metric satisfies the data migration criterion when the metric is below a threshold number of data access operations. At operation 530, the processing logic migrates data stored on a first block associated with the particular region to a second block. In some examples, the first block has less amount of valid data compared to other blocks associated with the particular region.

Figure 6:
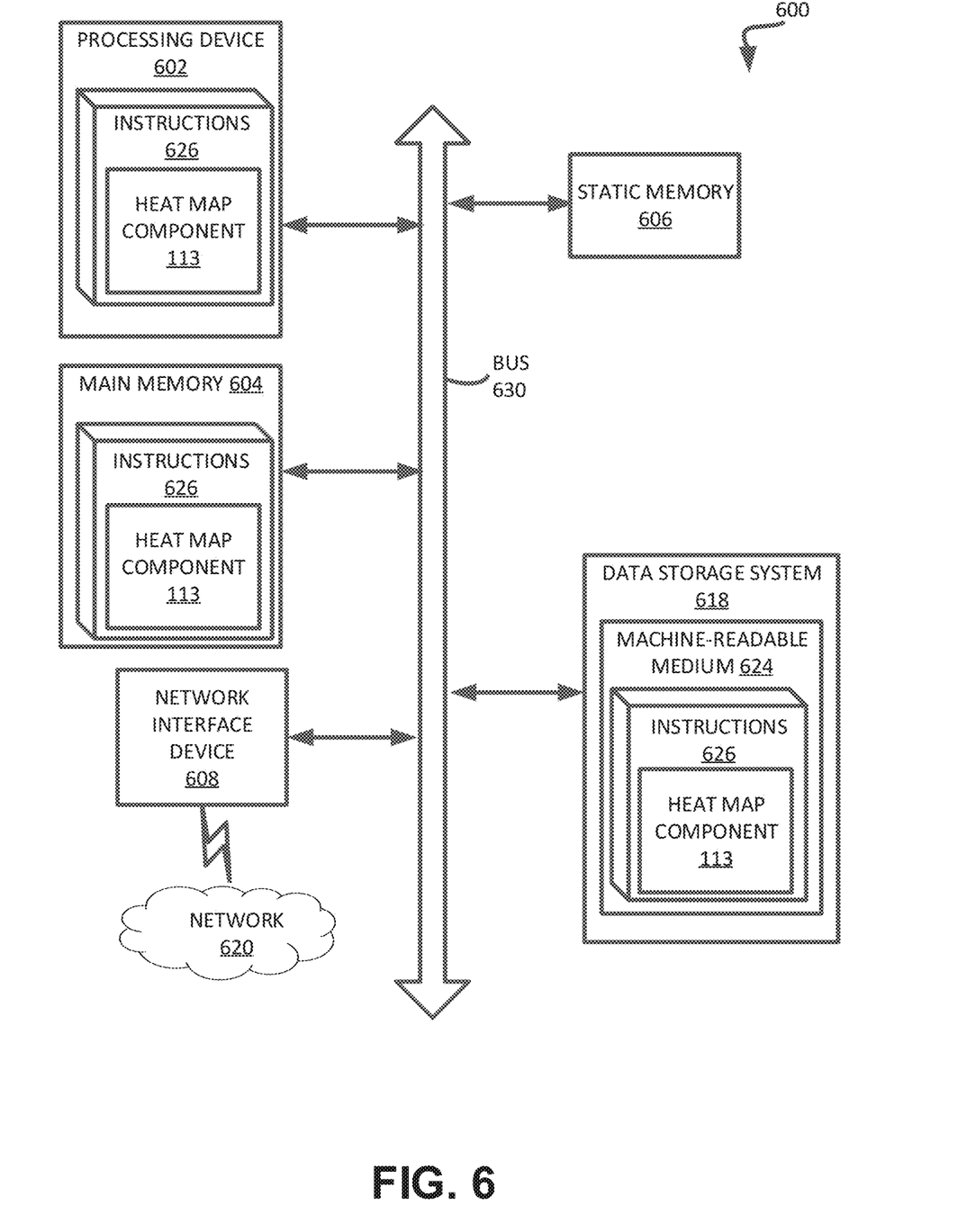
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the heat map component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a heat map component (e.g., the heat map component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
dividing a translation map into a plurality of portions of the translation map, the translation map mapping a plurality of logical block addresses to a plurality of physical block addresses of the memory device, each of the plurality of portions of the translation map corresponding to a plurality of blocks of the memory device, wherein at least one portion of the plurality of portions of the translation map comprises a plurality of entries, each entry mapping at least one of the plurality of logical block addresses to at least one of the plurality of physical block addresses of the memory device;
tracking a number of data access operations associated with each of the plurality of portions of the translation map;
determining that a criterion to perform a garbage collection operation is satisfied, the garbage collection operation to be performed on a block of the memory device;
identifying a particular portion of the plurality of portions of the translation map based on the number of data access operations associated with each of the plurality of portions of the translation map;
identifying the block for performing the garbage collection operation among a plurality of blocks of the memory device corresponding to the particular portion of the plurality of portions of the translation map; and
performing the garbage collection operation on the identified block,
wherein tracking the number of data access operations associated with each of the plurality of portions of the translation map comprises:
receiving a write request directed to a first logical block address associated with a first respective portion of the translation map;
performing the write operation using a first physical block address of the memory device;
updating the translation map to map the first logical block address to the first physic al block address on the first respective portion of the translation map; and
updating a write counter of write operations performed using the first respective portion of the translation map, and
wherein tracking the number of data access operations associated with each of the plurality of portions of the translation map comprises:
receiving a read request directed to a second logical block address associated with a second respective portion of the translation map;
performing the read operation using a second physic al block address of the memory device corresponding to the second logical block address; and
upon performing the read operation, updating a read counter of read operations performed using the second respective portion of the translation map.

2. The system of claim 1, wherein identifying the particular portion of the plurality of portions of the translation map based on the number of data access operations associated with each of the plurality of portions of the translation map comprises:
identifying the particular portion of the plurality of portions of the translation map based on comparing the number of data access operations for each of the portion of the plurality of portions of the translation map.

3. The system of claim 1, wherein identifying the block for performing the garbage collection operation among the plurality of blocks of the memory device corresponding to the particular portion of the plurality of portions of the translation map further comprises:
identifying the block for performing the garbage collection operation among the plurality of blocks of the memory device corresponding to the particular portion of the plurality of portions of the translation map based on an amount of valid data associated with each of the plurality of blocks of the memory device.

4. The system of claim 1, wherein the number of data access operations associated with the particular portion is less than the number of data access operations associated with other portions of the plurality of portions of the translation map.

5. The system of claim 1, wherein tracking the number of data access operations associated with each of the plurality of portions of the translation map comprises maintaining the write counter to track a count of write operations performed using each portion of the plurality of portions of the translation map.

6. The system of claim 1, wherein tracking the number of data access operations associated with each of the plurality of portions of the translation map comprises maintaining the read counter to track a count of read operations performed using each portion of the plurality of portions of the translation map.

7. The system of claim 1, wherein the criterion to perform the garbage collection operation is satisfied when a number of available blocks to perform write operations is below a threshold number.

8. A method comprising:
  dividing, by a processing device, a translation table into a plurality of regions, the translation table mapping a plurality of logical block addresses to a plurality of physical block addresses of a memory device, each of the plurality of regions corresponding to a plurality of blocks of the memory device, wherein at least one portion of the plurality of portions of the translation table comprises a plurality of entries, each entry mapping at least one of the plurality of logical block addresses to at least one of the plurality of physical block addresses of the memory device;
  determining that a metric associated with a particular region of the plurality of regions satisfies a garbage collection criterion; and
  migrating data stored on a first block associated with the particular region to a second block, wherein the first block is selected from a plurality of blocks of the memory device corresponding to the particular region of the plurality of regions with which the metric associated satisfies the garbage collection criterion,
  wherein the metric associated with each of the plurality of portions of the translation table is tracked by:
  receiving a write request directed to a first logical block address associated with a first respective portion of the translation table;
  performing the write operation using a first physical block address of the memory device;
  updating the translation table to map the first logical block address to the first physical block address on the first respective portion of the translation table; and
  updating a write counter of write operations performed using the first respective portion of the translation table, and
  wherein the metric associated with each of the plurality of portions of the translation table is tracked by:
  receiving a read request directed to a second logical block address associated with a second respective portion of the translation table;
  performing the read operation using a second physical block address of the memory device corresponding to the second logic al block address; and
  upon performing the read operation, updating a read counter of read operations performed using the second respective portion of the translation table.

9. The method of claim 8, wherein the metric comprises a number of data access operations associated with the particular region of the translation table.

10. The method of claim 8, wherein the metric satisfies the garbage collection criterion when the metric is below a threshold number of data access operations.

11. The method of claim 8, wherein the first block has less amount of valid data compared to other blocks associated with the particular region.

12. A non-transitory computer-readable storage medium comprising instructions that, when executed by a processing device, cause the processing device to:
  divide a translation map into a plurality of portions of the translation map, the translation map mapping a plurality of logical block addresses to a plurality of physical block addresses of the memory device, each of the plurality of portions of the translation map corresponding to a plurality of blocks of the memory device, wherein at least one portion of the plurality of portions of the translation map comprises a plurality of entries, each entry mapping at least one of the plurality of logical block addresses to at least one of the plurality of physical block addresses of the memory device;
  track a number of data access operations associated with each of the plurality of portions of the translation map;
  determine that a criterion to perform a garbage collection operation is satisfied, the garbage collection operation to be performed on a block of the memory device;
  identify a particular portion of the plurality of portions of the translation map based on the number of data access operations associated with each of the plurality of portions of the translation map;
  identify the block for performing the garbage collection operation among a plurality of blocks of the memory device corresponding to the particular portion of the plurality of portions of the translation map; and
  perform the garbage collection operation on the identified block,
  wherein to track the number of data access operations associated with each of the plurality of portions of the translation map, the processing device is to:
  receiving a write request directed to a first logical block address associated with a first respective portion of the translation map;
  performing the write operation using a first physical block address of the memory device;
  updating the translation map to map the first logical block address to the first physical block address on the first respective portion of the translation map; and
  updating a write counter of write operations performed using the first respective portion of the translation map, and
  wherein to track the number of data access operations associated with each of the plurality of portions of the translation map, the processing device is to:
  receiving a read request directed to a second logical block address associated with a second respective portion of the translation map;
  performing the read operation using a second physical block address of the memory device corresponding to the second logic al block address; and
  upon performing the read operation, updating a read counter of read operations performed using the second respective portion of the translation map.

13. The non-transitory computer-readable storage medium of claim 12, wherein to identify the particular portion of the plurality of portions of the translation map based on the number of data access operations associated with each of the plurality of portions of the translation map, the processing device is to:

identify the particular portion of the plurality of portions of the translation map based on comparing the number of data access operations for each of the portion of the plurality of portions of the translation map.

14. The non-transitory computer-readable storage medium of claim 12, wherein the processing device is further to identify the block for performing the garbage collection operation among the plurality of blocks of the memory device corresponding to the particular portion of the plurality of portions of the translation map based on an amount of valid data associated with each of the plurality of blocks of the memory device.

15. The non-transitory computer-readable storage medium of claim 12, wherein the number of data access operations associated with the particular portion is less than the number of data access operations associated with other portions of the plurality of portions of the translation map.

16. The non-transitory computer-readable storage medium of claim 12, wherein to track the number of data access operations associated with each of the plurality of portions of the translation map, the processing device is to:
  maintain the write counter to track a count of write operations performed using each portion of the plurality of portions of the translation map.

17. The non-transitory computer-readable storage medium of claim 12, wherein to track the number of data access operations associated with each of the plurality of portions of the translation map, the processing device is to:
  maintain the read counter to track a count of read operations performed using each portion of the plurality of portions of the translation map.

* * * * *